(12) United States Patent
Sato et al.

(10) Patent No.: US 7,612,013 B2
(45) Date of Patent: Nov. 3, 2009

(54) HYDROCARBON-PRODUCING CATALYST, PROCESS FOR PRODUCING THE SAME, AND PROCESS FOR PRODUCING HYDROCARBONS USING THE CATALYST

(75) Inventors: Kazuhito Sato, Satte (JP); Shigenori Nakashizu, Satte (JP); Osamu Iwamoto, Satte (JP); Hiroaki Otsuka, Satte (JP)

(73) Assignees: Japan Oil, Gas and Metals National Corporation, Kanagawa (JP); Cosmo Oil Co., Ltd., Tokyo (JP)

( * ) Notice: Subject to any disclaimer, the term of this patent is extended or adjusted under 35 U.S.C. 154(b) by 0 days.

(21) Appl. No.: 10/585,109

(22) PCT Filed: Feb. 23, 2005

(86) PCT No.: PCT/JP2005/003424

§ 371 (c)(1),
(2), (4) Date: Jan. 18, 2007

(87) PCT Pub. No.: WO2005/079979

PCT Pub. Date: Sep. 1, 2005

(65) Prior Publication Data

US 2008/0064769 A1 Mar. 13, 2008

(30) Foreign Application Priority Data

Feb. 24, 2004 (JP) ............................. 2004-047828
Feb. 24, 2004 (JP) ............................. 2004-047830

(51) Int. Cl.
| | |
|---|---|
| B01J 21/02 | (2006.01) |
| B01J 21/04 | (2006.01) |
| B01J 23/00 | (2006.01) |
| B01J 23/02 | (2006.01) |
| B01J 23/04 | (2006.01) |
| B01J 23/16 | (2006.01) |
| B01J 23/32 | (2006.01) |
| B01J 23/34 | (2006.01) |
| B01J 23/46 | (2006.01) |
| B01J 23/54 | (2006.01) |
| B01J 23/56 | (2006.01) |
| B01J 23/58 | (2006.01) |
| B01J 23/63 | (2006.01) |
| B01J 23/64 | (2006.01) |
| B01J 23/656 | (2006.01) |

(52) U.S. Cl. .................. 502/325; 502/302; 502/324; 502/328; 502/330; 502/332; 502/340; 502/341; 502/344; 502/355

(58) Field of Classification Search .............. 502/302, 502/324, 325, 328, 330, 332, 341, 344, 355, 502/340; 423/593.1, 594.15, 594.16, 599, 423/600, 625, 628, 635, 641; 977/810, 811
See application file for complete search history.

(56) References Cited

U.S. PATENT DOCUMENTS

| 4,206,134 | A | * | 6/1980 | Kugler et al. ............... 518/715 |
| 6,383,273 | B1 | * | 5/2002 | Kepner et al. ............ 106/15.05 |
| 7,378,368 | B2 | * | 5/2008 | Fukunaga et al. ........... 502/327 |

FOREIGN PATENT DOCUMENTS

| JP | 59-046133 | A | | 3/1984 |
| JP | 2003-003174 | A | | 1/2003 |
| JP | 2003-024786 | A | | 1/2003 |
| JP | 2003-512925 | A | | 4/2003 |
| JP | 2004-196874 | A | | 7/2004 |
| WO | WO 02/078840 | | * | 10/2002 |

OTHER PUBLICATIONS

L. Fan et al., Supercritical Phase Fischer-Tropsch Synthesis: Catalyst Pore-Size Effect, AICHE Journal, 1992, vol. 38, No. 10, pp. 1639 to 1648, full text.
Japanese Office Action dated Jul. 9, 2008 (Patent Application No. 2004/047,830).
Japanese Office Action dated Jul. 9, 2008 (Patent Application No. 2004/047,828).
Japanese Office Action dated Sep. 24, 2008 (Patent Application No. 2004-047828).
Japanese Office Action dated Sep. 24, 2008 (Patent Application No. 2004-047830).

* cited by examiner

*Primary Examiner*—Timothy C Vanoy
*Assistant Examiner*—Serena L Hanor
(74) *Attorney, Agent, or Firm*—Sughrue Mion, PLLC

(57) ABSTRACT

An object of the present invention is to provide a catalyst which, in the FT process, exhibits a high chain growth probability, and a high catalytic activity, can stably and smoothly promote the reaction, exhibits a high productivity of $C_5+$, and can efficiently produce liquid hydrocarbons, and a process therefore. The invention relates to a hydrocarbon-producing catalyst obtainable by supporting a ruthenium compound on a support composed of a manganese oxide and an aluminum oxide, and which satisfies at least one of characteristics (1) and (2): (1) the catalyst being treated with an aqueous alkaline solution and subsequently subjected to calcination treatment in the air at 150 to 500° C., (2) the aluminum oxide being an aluminum oxide wherein pore volume formed by pores having a pore diameter of 8 nm or more accounts for 50% or more of total pore volume.

14 Claims, No Drawings

HYDROCARBON-PRODUCING CATALYST, PROCESS FOR PRODUCING THE SAME, AND PROCESS FOR PRODUCING HYDROCARBONS USING THE CATALYST

FIELD OF THE INVENTION

The present invention relates to a catalyst for producing hydrocarbons from a mixed gas containing hydrogen and carbon monoxide as main components (hereinafter referred to as "syngas"), a process for producing the same, and a process for producing hydrocarbons. More specifically, it relates to a process for producing hydrocarbons, particularly hydrocarbons which contain a low amount of $C_1$ to $C_4$ gaseous components and are rich in a kerosene and gas oil fraction and wax components easily convertible into the kerosene and gas oil fraction.

BACKGROUND ART

As processes for synthesizing hydrocarbons from a syngas, the Fischer-Tropsch reaction, methanol synthesizing reaction, and the like are well known. It is known that the Fischer-Tropsch reaction proceeds with a catalyst of an iron group such as iron or cobalt or a platinum group such as ruthenium, methanol synthesizing reaction with a copper-based catalyst, and oxygen-containing $C_2$ (ethanol, acetaldehyde, and the like) synthesis with a rhodium-based catalyst. In addition, the catalytic ability of the catalyst for use in the synthesis of these hydrocarbons is strongly linked to dissociative adsorption ability for carbon monoxide [for example, see Non-Patent Reference 1 ("Kin-itsu Shokubai to Fukin-itsu Shokubai", collaboration of Hidai and Ichikawa, Maruzene, published in 1983)].

Incidentally, in recent years, a gas oil of a low sulfur content has been desired from the viewpoint of air environmental conservation, and this trend may still more increase hereafter. Moreover, from the viewpoint that crude oil resources are limited, it is desired to develop an alternative energy source and this development may be increasingly desired hereafter. As a technology responding to these requests, GTL (gas to liquids) is present, which is a technology synthesizing liquid fuels such as kerosene and gas oil from natural gas (main component: methane gas) whose minable reserves are said to be comparative to crude oil in terms of energy. Since natural gas contains no sulfur or, even if contains hydrogen sulfide ($H_2S$) and the like which are easy to desulfurize, the resulting liquid fuels such as kerosene and gas oil hardly contain sulfur and possess an advantage that they can be utilized as high-performance diesel fuels having a high cetane number, so that GTL has recently attracted increasing attention.

As a part of the above GTL, a process for producing hydrocarbons from a syngas by the Fischer-Tropsch reaction (hereinafter referred to as "FT reaction") has been actively investigated. At the production of hydrocarbons by the FT reaction, it is important to efficiently synthesize hydrocarbons corresponding to $C_{10}$ to $C_{16}$ in order to enhance a yield of a kerosene and gas oil fraction. In general, a hydrocarbon distribution of the hydrocarbon products in the FT reaction follows the Shultz-Flory rule. In the Shultz-Flory rule, a chain growth probability, α value, tends to decrease remarkably with elevation of the reaction temperature, that is, when the reaction temperature elevates, there is a tendency that carbon numbers of formed hydrocarbons remarkably decrease. In the past, technological development such as catalyst development has been actively investigated for the purpose of solving a problem how to disengage the restriction of the Shultz-Flory rule and how to synthesize hydrocarbons having specific carbon numbers selectively. However, a technology capable of sufficiently solving the problem has not yet been proposed. Recently, there becomes common an idea of enhancing yields of fractions capable of being easily convertible into a kerosene and gas oil fraction by hydrogenolysis, such as waxes and, as a result, enhancing a yield of a kerosene and gas oil fraction by hydrogenolysis of the waxes, without persisting in disengaging the restriction of the Shultz-Flory rule. However, the chain growth probability is currently about 0.85 and it is one recent technical problem how to enhance the probability. On the other hand, when the chain growth probability is enhanced too much, almost all of formed hydrocarbons are waxes, so that there arises a handling problem because the waxes are in turn apt to solidify during process operations. Also, in view of the general performance of a catalyst, the chain growth probability of about 0.95 is considered to be virtual upper limit.

As another method for further enhancing the yield of the kerosene and gas oil fraction, it is considered to be effective to use a catalyst having an excellent performance whose hydrocarbon-producing ability, i.e., activity is high, yields of gaseous components are low, liquid yields and chain growth probability are high, and activity is stably exhibited for a long period of time.

Hitherto, various catalysts for the FT reaction have been proposed and, as catalysts for the purpose of high selectivity to olefins, ruthenium-based catalysts, such as a catalyst wherein ruthenium is supported on a manganese oxide support and a catalyst wherein a third component is further added to the ruthenium-supported catalyst have been proposed [see Patent Document 1 (JP-B-3-70691) and Patent Document 2 (JP-B-3-70692)].

However, in the FT method using these ruthenium-based catalysts, enhancement of the yield of the above kerosene and gas oil fraction cannot be sufficiently achieved. Namely, the above ruthenium-based catalysts are excellent in selectivity to olefins but their catalytic activity is low and a yield of a liquid hydrocarbon fraction having 5 or more carbon atoms (hereinafter abbreviated as "$C_5$+") itself is low.

The present inventors invented a process for producing hydrocarbons, which comprises subjecting a catalyst to reduction treatment beforehand, dispersing the treated catalyst in liquid hydrocarbons in an concentration of 1 to 50% by weight, and bringing a mixed gas containing hydrogen and carbon monoxide as main components into contact with the dispersed catalyst at a pressure of 1 to 10 MPa at a reaction temperature of 170 to 300° C., the catalyst being obtained by supporting a sodium compound on a support composed of an aluminum oxide and a manganese oxide in an amount of 0.1 to 10% by weight on the basis of the catalyst and by further supporting ruthenium in an amount of 1 to 30% by weight on the basis of the catalyst and exhibiting a specific surface area of 60 to 350 m²/g and a bulk density of 0.8 to 1.8 g/ml, and they filed a patent application thereon [see Patent Document 3 (JP-A-2003-3174)].

The process for producing hydrocarbons according to the above invention is an excellent process in view of a high chain growth probability, an excellent selectivity to olefins, and capability of carrying out the reaction stably and smoothly with a high catalytic activity but, from the viewpoint of productivity of $C_5$+, further enhancement thereof is desired. Namely, in general, when a catalyst having a high productivity of objective products per catalyst weight is used, it can be expected to reduce a catalyst cost and a facility cost, for example, catalyst weight to be used for obtaining the same amount of objective products can be reduced and, as a result, a reactor can be small-sized. Therefore, even in a process for producing hydrocarbons such as the process for producing hydrocarbons according to the above previous invention, further enhancement of $C_5+$ productivity of a catalyst to be used is desired.

[Patent Document 1]
　JP-B-2-70691
[Patent Document 2]
　JP-B-2-70692
[Patent Document 3]
　JP-A-2003-3174
[Non-Patent Reference 1]
　"Kin-itsu Shokubai to Fukin-itsu Shokubai", collaboration of Hidai and Ichikawa, Maruzene, published in 1983

DISCLOSURE OF THE INVENTION

An object of the invention is to provide a catalyst which, in the FT process, exhibits a high chain growth probability, and a high catalyst activity, can stably and smoothly promote the reaction, exhibits a high productivity of $C_5+$, and can efficiently produce liquid hydrocarbons, as well as a process therefor.

As a result of the further extensive studies for achieving the above object, the present inventors have found that, in the above catalyst previously invented for use in the production of hydrocarbons, activity of the catalyst is dramatically enhanced by treating the catalyst with an aqueous alkaline solution after the supporting of the ruthenium compound and subsequently subjecting to calcination treatment in the air and also productivity of a $C_5+$ liquid hydrocarbon fraction is enhanced with a little formation of $C_1$ to $C_4$ gaseous components. Thus, they have accomplished the present invention.

In addition, they have found that activity of the catalyst is remarkably enhanced by using a catalyst wherein ruthenium is supported on a support composed of a manganese oxide and a specific aluminum oxide and productivity of a $C_5+$ liquid hydrocarbon fraction is also enhanced with a little formation of $C_1$ to $C_4$ gaseous components. Thus, they have accomplished the present invention.

Namely, the invention relates to a hydrocarbon-producing catalyst and a process for producing hydrocarbons having the following constitutions.
1) A hydrocarbon-producing catalyst obtainable by supporting a ruthenium compound on a support composed of a manganese oxide and an aluminum oxide and, which satisfies at least one of characteristics (1) and (2):
　(1) the catalyst being treated with an aqueous alkaline solution and subsequently subjected to calcination treatment in the air at 150 to 500° C.,
　(2) the aluminum oxide being an aluminum oxide in which pore volume formed by pores having a pore diameter of 8 nm or more accounts for 50% or more of total pore volume.
2) The catalyst according to the above 1), wherein the supported amount of the ruthenium compound is from 0.5 to 5% by weight in terms of ruthenium metal on the basis of the catalyst before the treatment with the aqueous alkaline solution and the calcination treatment.
3) The catalyst according to the above 1) or 2), wherein at least one compound selected from alkali metal compounds, alkaline earth metal compounds, and rare earth metal compounds is further supported on the support.
4) The catalyst according to the above 3), wherein the supported amount of at least one compound selected from alkali metal compounds, alkaline earth metal compounds, and rare earth metal compounds is from 0.01 to 3% by weight in terms of oxide on the basis of the catalyst before the treatment with the aqueous alkaline solution and the calcination treatment.
5) The catalyst according to any one of the above 1) to 4), wherein the ratio of the manganese compound is from 10 to 70% by weight on the basis of the catalyst before the treatment with the aqueous alkaline solution and the calcination treatment.
6) The catalyst according to any one of the above 3) to 5), wherein at least one compound selected from alkali metal compounds, alkaline earth metal compounds, and rare earth metal compounds is a sodium compound.
7) A process for producing hydrocarbons, which comprises bringing a mixed gas containing hydrogen and carbon monoxide into contact with the catalyst according to any one of the above 1) to 6).
8) A process for producing a hydrocarbon-producing catalyst, which comprises treating, with an aqueous alkaline solution, a catalyst obtainable by supporting a ruthenium compound on a support composed of a manganese oxide and an aluminum oxide and subsequently subjecting the catalyst to calcination treatment in the air at 150 to 500° C.
9) The process according to the above 8), wherein the supported amount of the ruthenium compound is from 0.5 to 5% by weight in terms of metal on the basis of the catalyst before the treatment with the aqueous alkaline solution and the calcination treatment.
10) The process according to the above 8) or 9), wherein at least one compound selected from alkali metal compounds, alkaline earth metal compounds, and rare earth metal compounds is further supported on the support.
11) The process according to the above 10), wherein the supported amount of at least one compound selected from alkali metal compounds, alkaline earth metal compounds, and rare earth metal compounds is from 0.01 to 3% by weight in terms of oxide on the basis of the catalyst before the treatment with the aqueous alkaline solution and the calcination treatment.
12) The process according to any one of the above 8) to 11), wherein the ratio of the manganese compound is from 10 to 70% by weight on the basis of the catalyst before the treatment with the aqueous alkaline solution and the calcination treatment.
13) The process for producing the catalyst according to any one of the above 10) to 12), wherein at least one compound selected from alkali metal compounds, alkaline earth metal compounds, and rare earth metal compounds is a sodium compound.
14) A process for producing hydrocarbons, which comprises bringing a mixed gas containing hydrogen and carbon monoxide into contact with the catalyst obtained by the production process according to any one of the above 8) to 13).

According to the invention, there is provided a catalyst which exhibits a high activity, forms a little gaseous components, and exhibits a high productivity of a $C_5+$ liquid hydrocarbon fraction, a process for producing the same, and a process for producing hydrocarbons using the catalyst.

BEST MODE FOR CARRYING OUT THE INVENTION

The following will describe the invention in detail.
The catalyst for use in the invention is a hydrocarbon-producing catalyst obtainable by supporting a ruthenium compound on a support composed of a manganese oxide and an aluminum oxide, and which satisfies at least one of characteristics (1) and (2):

(1) the catalyst being treated with an aqueous alkaline solution and subsequently subjected to calcination treatment in the air at 150 to 500° C. (Embodiment 1), (2) the aluminum oxide being an aluminum oxide in which pore volume formed by pores having a pore diameter of 8 nm or more accounts for 50% or more of total pore volume (Embodiment 2).

The following will describe preparation of the catalysts of the above Embodiments 1 and 2, respectively.

1. With regard to Embodiment 1:

In the process for producing the catalyst according to the invention, a catalyst is obtained by supporting a ruthenium compound on a support composed of a manganese oxide and an aluminum oxide, followed by drying. The process is characterized by conducting an operation of treating the catalyst with an aqueous alkaline solution and a subsequent operation of subjecting the resulting catalyst to calcination treatment in the air, whereby an active catalyst having a remarkably enhanced catalytic activity can be obtained. In particular, for achieving the object of the invention, it is technically important to combine the above two operations in this order.

Incidentally, the above catalyst itself has activity but an active catalyst having a remarkably enhanced catalytic activity can be obtained by conducting the treatment with an aqueous alkaline solution and the calcination treatment.

(Process for Producing Hydrocarbon-Producing Catalyst)

In the process for producing the catalyst of the invention, examples of the manganese oxide of the support composed of a manganese oxide and an aluminum oxide preferably include $MnO$, $Mn_3O_4$, $Mn_2O_3$, $MnO_2$, and the like. In addition, using various manganese salts such as manganese nitrate, manganese carbonate, and manganese acetate as starting materials, manganese oxides obtained from these salts may be also employed. For example, $Mn_2O_3$ or the like obtained by calcination of manganese nitrate in the air can be preferably used.

As examples of the aluminum oxide, use can be made of those in various crystalline state such as α, β, γ, η and θ, or hydrates of aluminum oxides, such as gibbsite, hyalite, and boehmite. These aluminum oxides can be produced by hitherto known methods. For example, they are obtained by pyrolysis of the above hydrates of the aluminum oxides. The hydrates of the aluminum oxides are obtained by hydrolysis or pyrolysis of aqueous solutions of various aluminum salts such as aluminum chloride, aluminum nitrate, and alkali aluminates. Aluminum oxides (particularly, γaluminum oxide) obtained by calcination and having a low crystallinity, such as boehmite, are more preferable than aluminum oxides obtained by calcination of hydrates of aluminum oxides containing a large amount of aluminum oxides having a high crystallinity, such as bayerite and gibbsite, because of the large specific surface area and pore volume thereof. Furthermore, aluminum oxides obtained by a sol-gel process wherein aluminum alkoxides such as aluminum isopropoxide are hydrolyzed can also be preferably used because of their large specific surface area and pore volume.

The activity of the catalyst wherein ruthenium is supported on a support can be further enhanced by preparing it so that the ratio of the manganese oxide in the catalyst before the above treatment with an aqueous alkaline solution and the above calcination treatment becomes from 10 to 70% by weight, preferably from 15 to 60% by weight. Namely, by making the ratio of the manganese oxide 10% by weight or more, the formation of the $C_1$ to $C_4$ gaseous components can be further suppressed and furthermore the selectivity to the $C_5+$ fraction can be increased. Moreover, by making the ratio of the manganese oxide 70% by weight or less, it becomes possible to secure a sufficient specific surface area of the catalyst and dispersibility of an active metal such as ruthenium metal can be enhanced, whereby the catalytic activity can be further enhanced.

The support composed of a manganese oxide and an aluminum oxide can be prepared according to a conventional method and is usually prepared via drying and calcination after preparation of a precursor of the support. For example, the precursor of the support can be obtained according to a method wherein the aluminum oxide is impregnated with an aqueous solution of one of various manganese salts, which is a starting material of the manganese oxide or contrarily, the manganese oxide is impregnated with an aqueous solution of one of various aluminum salts, which is a starting material of the aluminum oxide, or a method wherein an aqueous alkaline solution is added to a mixture of aqueous solutions of both salts to achieve coprecipitation. Furthermore, the precursor of the support can be also obtained by physically mixing a starting material of the manganese oxide and a starting material of the aluminum oxide. As another method for preparing the precursor of the support, it can be mentioned to form the precursor of the support using a method of spraying a mixture comprising a starting material of the manganese oxide and a starting material of the aluminum oxide. The resulting precursor of the support is dried and then baked to afford the support.

A calcination temperature at this time is generally from 200 to 900° C., preferably from 300 to 800° C., more preferably 400 to 700° C. When the calcination temperature is within the above range, the specific surface area of the support is appropriate and the oxides are thoroughly formed, so that an activated and stable support is obtained. The support of any shape such as a powder, a granule, a tableted molded article, or an extruded molded article can be used.

A ruthenium compound is supported on the support obtained as mentioned above. The supported amount of the ruthenium compound is from 0.5 to 5% by weight, preferably from 0.8 to 4.5% by weight, more preferably from 1 to 4% by weight, in terms of ruthenium metal on the basis of the catalyst before the above treatment with an aqueous alkaline solution and the above calcination treatment. The supported amount of ruthenium is relevant to the number of active sites. When the supported amount of ruthenium is within the above range, a sufficient number of the active sites is obtained and the interaction with the components of the support is also sufficient, which may result in excellent catalytic activity and selectivity.

In this connection, the chemical composition of the catalyst can be determined by an inductively-coupled plasma mass spectrometry (ICP method).

In the invention, the activity can be further enhanced by supporting at least one compound selected from alkali metal compounds, alkaline earth metal compounds, and rare earth metal compounds (hereinafter generally referred to as "metal compound such as alkali metal compound") in addition to the ruthenium compound. The supporting of the metal compound such as alkali metal compound is from 0.01 to 3% by weight, preferably from 0.015 to 2.5% by weight, more preferably from 0.02 to 2% by weight in terms of oxide on the basis of the catalyst before the above treatment with an aqueous alkaline solution and the above calcination treatment. The formation of the $C_1$ to $C_4$ gaseous components can be suppressed by supporting the metal compound such as alkali metal compound in an amount of 0.01% by weight or more and thus liquid yield of $C_5+$ can be further enhanced. In this connection, when the supported amount of the metal compound such as alkali metal exceeds 3% by weight, no change is observed in the above effect but when the amount exceeds the limit too much, the activity and liquid yield tend to remarkably decrease, so that the case is not preferable.

The metal compound such as alkali metal compound includes chlorides, carbonate salts, nitrate salts, and the like of sodium, potassium, lithium, beryllium, magnesium, calcium, barium, yttrium, cerium, lanthanum, and the like. Of these, sodium compounds such as sodium carbonate and sodium nitrate are preferable.

The ruthenium compound can be supported on the above support composed of the manganese oxide and the aluminum oxide by bringing the support into contact with a solution of a catalyst species compound, for example, immersing the support in a solution of a ruthenium compound to adsorb the ruthenium compound on the support, attaching the compound onto the support through ion exchange, adding a precipitating agent such as an alkali to cause precipitation, evaporating the solution to dryness, or dropping the solution of the catalyst species compound on the support. At this time, the supported amount of the ruthenium compound is regulated so as to be the above-predetermined amount. The ruthenium compound can be suitably selected from various ruthenium compounds hitherto used for preparation of ruthenium-supported catalysts and used. Examples thereof preferably include water-soluble ruthenium salts such as ruthenium chloride, ruthenium nitrate, ruthenium acetate, and hexaammonia ruthenium chloride, organic solvent-soluble ruthenium compounds such as ruthenium carbonyl and ruthenium acetylacetonate, and the like. After the supporting of the ruthenium compound, removal of water and drying at 80 to 110° C. affords the catalyst.

In the case that a metal compound such as alkali metal is supported in addition to the ruthenium compound, the metal compound can be supported in the same manner as in the method of supporting the ruthenium compound. At that time, the order of supporting the ruthenium compound and the metal compound such as alkali metal may be any order or they may be supported simultaneously. For obtaining a more highly active catalyst, it is preferable to support the ruthenium compound after the supporting of the metal compound such as alkali metal. At that time, the most preferred is that, after the metal compound such as alkali metal is first supported and water is removed, the product is baked at 200 to 900° C., then the ruthenium compound is supported thereon, and after removal of water, the resulting product is dried. In the case that the ruthenium compound is first supported, after the supporting of the ruthenium compound and drying the product, treatment with an aqueous alkali solution to be mentioned below and calcination are necessary and thus, it is preferable that the metal compound such as alkali metal is thereafter supported and the product is baked at 150 to 500° C.

The precursor of the catalyst obtained by incorporating the ruthenium compound or the ruthenium compound and the metal compound such as alkali metal into the support as mentioned above is immersed in an aqueous alkaline solution to achieve post treatment. As the aqueous alkaline solution, use can be made of ammonia water, an aqueous sodium hydroxide solution, an aqueous sodium carbonate solution, an aqueous potassium carbonate solution, or the like. Ammonia water can be preferably used. In consideration of the effect expressed by the post treatment and economical factors such as amount of water and time required for unreacted alkali and a washing step, the concentration of the alkali in the aqueous alkali solution is from 0.05 to 1 mol/l, preferably from 0.05 to 0.5 mol/l, more preferably from 0.05 to 0.2 mol/l. The time for the post treatment depends on the concentration of the alkali but usually preferable time is from 1 to 10 hours. After the post treatment with the aqueous alkaline solution, the product is washed with water to thoroughly wash out excessive alkali and dried at room temperature to 120° C.

In the invention, the catalyst subjected to the above treatment with the aqueous alkaline solution is baked in the air. The calcination temperature is from 150 to 500° C., preferably from 200 to 450° C. from the viewpoint of enhancement of catalytic activity by calcination treatment and suppression of a decrease of the number of active sites which may be induced by the progress of excessive aggregation of ruthenium metal. The calcination time depends on an amount to be treated but is usually from 1 to 10 hours in consideration of the effects expressed by calcination treatment and workability and productivity. In fact, even when the calcination time exceeds 10 hours, the enhancement of catalytic activity by the calcination is about the same as in the case of 10 hours or less, so that the time of 10 hours or less is preferred. In this connection, it is essential to conduct the calcination treatment in the air and a sufficient enhancement of catalytic activity is not observed under a reductive condition.

Although detail of the reasons for the remarkable enhancement of catalytic activity by the treatment with the aqueous alkali solution and subsequent calcination treatment is not clear, in the catalyst prepared by the production process of the invention, remarkable enhancement of the activity is observed as compared with any of the catalysts prepared by conducting calcination treatment alone, treatment with the aqueous alkali solution alone, or treatment with the aqueous alkali solution after calcination treatment. Thus, these both treatments are necessary and it is essential to conduct calcination treatment after the treatment with the aqueous alkali solution.

2. With Regard to Embodiment 2:

The catalyst for use in the invention can be prepared by supporting a ruthenium compound on a support composed of a manganese oxide and a specific aluminum oxide, followed by drying. The following will describe the preparation of the catalyst.

(Preparation of Catalyst)

In the catalyst for use in the invention, examples of the manganese oxide of the support composed of a manganese oxide and an aluminum oxide preferably include MnO, $Mn_3O_4$, $Mn_2O_3$, $MnO_2$, and the like. In addition, using various manganese salts such as manganese nitrate, manganese carbonate, and manganese acetate as starting materials, manganese oxides obtained from these salts may be also employed. For example, $Mn_2O_3$ or the like obtained by calcination manganese nitrate in the air can be preferably used.

As examples of the aluminum oxide, use can be made of those in various crystalline state such as α, β, γ, η, and θ, or hydrates of aluminum oxides, such as gibbsite, bayerite, and boehmite. These aluminum oxides can be produced by hitherto known methods. For example, they are obtained by pyrolysis of the above hydrates of the aluminum oxides. The hydrates of the aluminum oxides are obtained by hydrolysis or pyrolysis of an aqueous solution of various aluminum salts such as aluminum chloride, aluminum nitrate, and alkali aluminates. Aluminum oxides (particularly, γ-aluminum oxide) obtained by calcination, and those having a low crystallinity, such as boehmite, are more preferable than aluminum oxides obtained by calcination of hydrates of aluminum oxides containing a large amount of those having a high crystallinity, such as bayerite and gibbsite, because of large specific surface area and pore volume. Furthermore, aluminum oxides obtained by a sol-gel process where aluminum alkoxides such as aluminum isopropoxide are hydrolyzed can be also preferably used because of large specific surface area and pore volume.

Furthermore, it is an important factor that the aluminum oxide constituting the catalyst to be used in the invention has a specific pore structure. Namely, by using an aluminum oxide in which the pore volume formed by pores having a pore diameter of 8 nm or more accounts for 50% or more, preferably 60% or more, more preferably 70% or more, of total pore volume, a good FT reaction which exhibits a high activity and is excellent in C5+ productivity can be obtained and also the activity can be maintained for a long period of time. A precise mechanism wherein the effects are expressed is currently being intensively investigated and it is not yet clear but is considered to be as follows: in the case that the pore volume formed by pores having a pore diameter of 8 nm or more accounts for 50% or less, that is, relatively small pores are main pores, diffusion of higher hydrocarbons such as waxes formed by the FT reaction to outside the pores and diffusion of a syngas, a starting gas, to inside the pores, are suppressed.

The total pore volume of the aluminum oxide is not particularly prescribed but is preferably 0.3 $cm^3/g$ or more in consideration of the dispersibility of the active metal. Moreover, the upper limit is also not particularly prescribed but is preferably 1.2 $cm^3/g$ or less because too large a pore volume may result in a decrease of mechanical strength and the possible occurrence of pulverization of the catalyst during the reaction as well as in the production thereof.

The control of the pore structure of the aluminum oxide can be achieved by a hitherto known preparation process. Specifically, the control is possible by controlling pH, temperature, and aging time at the preparation of a hydrate of the above aluminum oxide or by controlling the calcination temperature of the hydrate. Moreover, a commercially available aluminum oxide in which the pore structure is variously controlled can be also employed.

The aforementioned pore diameter and pore volume were determined according to D-H method based on measurement of an isothermal curve (−196° C.) of nitrogen adsorption and desorption.

The activity of the catalyst can be further enhanced by preparing it so that the ratio of the manganese oxide in the catalyst becomes from 10 to 70% by weight, preferably from 15 to 60% by weight. Namely, by making the ratio of the manganese oxide 10% by weight or more, the formation of the $C_1$ to $C_4$ gaseous components can be further suppressed and furthermore the selectivity to the $C_5+$ fraction can be increased. Moreover, by making the ratio of the manganese oxide 70% by weight or less, it becomes possible to secure a sufficient specific surface area of the catalyst and dispersibility of an active metal such as ruthenium metal can be enhanced, whereby the catalytic activity can be further enhanced.

The support composed of a manganese oxide and an aluminum oxide can be prepared according to a conventional method and is usually prepared via drying and calcination after preparation of a precursor of the support. For example, the precursor of the support can be obtained according to a method wherein the aluminum oxide is impregnated with an aqueous solution of one of various manganese salts, which is a starting materials of the manganese oxide or contrarily, the manganese oxide is impregnated with an aqueous solution of one of various aluminum salts, which is a starting materials of the aluminum oxide, or a method wherein an aqueous alkaline solution is added to a mixture of aqueous solutions of both salts to achieve coprecipitation. Furthermore, the precursor of the support can be also obtained by physically mixing a starting material of the manganese oxide and a starting material of the aluminum oxide. As another method for preparing the precursor of the support, it can be mentioned to form the precursor of the support using a method of spraying a mixture comprising a starting material of the manganese oxide and a starting material of the aluminum oxide. The resulting precursor of the support is dried and then baked to afford the support.

A calcination temperature at this time is generally from 200 to 900° C., preferably from 300 to 800° C., more preferably 400 to 700° C. When the calcination temperature is 900° C. or lower, the specific surface area of the support is appropriate and when the calcination temperature is 200° C. or higher, activation is achieved and the oxides are thoroughly formed, which results in an excellent stability of the support. The shape of the support is not particularly limited but any shape such as a powder, a granule, a tableted molded article, or an extruded molded article can be used according to the reaction mode to be mentioned below.

A ruthenium compound is supported on the support obtained as mentioned above. The supported amount of the ruthenium compound is from 0.5 to 5% by weight, preferably from 0.8 to 4.5% by weight, more preferably from 1 to 4% by weight in terms of ruthenium metal on the basis of the catalyst. The supported amount of ruthenium is relevant to the number of active site. When the supported amount of ruthenium is within the above range, a sufficient number of the active sites is obtained and the interaction with the components of the support is also sufficient, which may result in excellent catalytic activity and selectivity.

In this connection, the chemical composition of the catalyst can be determined by an inductively-coupled plasma mass spectrometry (ICP method).

In the invention, the performance of the catalyst can be further enhanced by supporting at least one compound selected from alkali metal compounds, alkaline earth metal compounds, and rare earth metal compounds (hereinafter generally referred to as "metal compound such as alkali metal") in addition to the ruthenium compound. The supporting of the metal compound such as alkali metal is from 0.01 to 3% by weight, preferably from 0.015 to 2.5% by weight, more preferably from 0.02 to 2% by weight in terms of oxide on the basis of the catalyst.

The formation of the $C_1$ to $C_4$ gaseous components can be suppressed by supporting the metal compound such as alkali metal in an amount of 0.01% by weight or more and thus liquid yield of $C_5+$ can be further enhanced. In this connection, when the supported amount of the metal compound such as alkali metal exceeds 3% by weight, no change is observed in the above effect but when the amount exceeds the limit too much, the activity and liquid yield tend to remarkably decrease, so that the case is not preferable.

The metal compound such as alkali metal compound includes chlorides, carbonate salts, nitrate salts, and the like of sodium, potassium, lithium, beryllium, magnesium, calcium, barium, yttrium, cerium, lanthanum, and the like. Of these, sodium compounds such as sodium carbonate and sodium nitrate are preferable.

The ruthenium compound can be supported on the support composed of a manganese oxide and an aluminum oxide by bringing the support into contact with a solution of a catalyst species compound, for example, immersing the support in a solution of a ruthenium compound to adsorb the ruthenium compound on the support, attaching the compound onto the support through ion exchange, adding a precipitating agent such as an alkali to cause precipitation, evaporating the solution to dryness, or dropping the solution of the catalyst species compound on the support. At this time, the supported amount of the ruthenium compound is regulated so as to be the above-predetermined amount. The ruthenium compound can be suitably selected from various ruthenium compounds hitherto used for preparation of ruthenium-supported catalysts and used. Examples thereof preferably include water-soluble ruthenium salts such as ruthenium chloride, ruthenium nitrate, ruthenium acetate, and hexaammonia ruthenium chloride, organic solvent-soluble ruthenium compounds such as ruthenium carbonyl and ruthenium acetylacetonate, and the like. After the supporting of the ruthenium compound, water is removed and drying is conducted at 80 to 110° C.

In the case that a metal compound such as alkali metal is supported in addition to the ruthenium compound, the metal compound can be supported in the same manner as in the method of supporting the ruthenium compound. At that time, the order of supporting the ruthenium compound and the metal compound such as alkali metal may be any order or they may be supported simultaneously. For obtaining a more highly active catalyst, it is preferable to support the ruthenium compound after the supporting of the metal compound such as alkali metal. At that time, the most preferred is that, after the metal compound such as an alkali metal is first supported and water is removed, the product is baked at 200 to 900° C., then the ruthenium compound is supported thereon, and after removal of water, the resulting product is dried.

The specific surface area of the catalyst of the invention is from 20 to 300 m$^2$/g, preferably 30 to 250 m$^2$/g, further preferably 40 to 200 m$^2$/g. When the specific surface area is 20 m$^2$/g or more, dispersibility of the compound of an alkali metal or the like and ruthenium is satisfactory and thus the case is preferable. Moreover, with regard to the upper limit of the specific surface area, in general, at handling of a solid catalyst, the wider specific surface area may result in increased contacting frequency among gas, liquid and solid, and thus is preferable.

When the pore volume is less than 0.1 cm$^3$/g, there is a possibility of decrease in dispersibility of an active metal species and hence the case is not preferable. Moreover, the pore volume is preferably 1.2 cm$^3$/g or less since too large pore volume may result in decrease of mechanical strength and possible occurrence of pulverization of the catalyst during the reaction as well as from a technical viewpoint in the production thereof.

Furthermore, an average pore diameter of the catalyst of the invention is from 8 to 30 nm, more preferably from 9 to 25 nm. When the average pore diameter of the catalyst is within the above range, the diffusion of reaction gases and products on the catalyst surface is satisfactory and the mechanical strength is also high, so that no pulverization of the catalyst occurs during the reaction.

It is also possible to subject the catalyst of the invention to the treatment with the aqueous alkaline solution and the calcination treatment described in the above Embodiment 1. Thereby, the catalytic activity can be further enhanced.

The following will describe the process for producing hydrocarbons according to the invention.

(Process for Producing Hydrocarbons)

In the process for producing hydrocarbons according to the invention, the catalyst prepared as in the above Embodiment 1 or 2 is used and provided to the FT reaction. With regard to the type of the reactor for the FT reaction, a fixed bed, a fluidized bed, a suspended bed, a slurry bed, or the like may be mentioned. As one example thereof, the following will describe a process for producing hydrocarbons using a slurry bed. In the case that activity evaluation of the catalyst is conducted on a slurry bed, a powdery one is preferable as the shape of the catalyst and a range of catalyst particle distribution is preferably from 0.5 μm to 150 μm, further preferably from 0.5 μm to 120 μm, most preferably from 1.0 μm to 105 μm. In the case of a slurry bed reaction type, the catalyst is used in a state dispersed in a liquid hydrocarbon or the like.

At that time, when the catalyst particle distribution is within the above range, the particle size is appropriate, so that it is easy to maintain a catalyst concentration in a reaction vessel, the possibility to extravasate the catalyst particles to a downstream side is small, and the catalyst particles are homogeneously dispersed all over the reaction vessel, whereby the reaction activity is maintained.

In the process for producing hydrocarbons according to the invention, the catalyst prepared as mentioned above is subjected to reduction treatment (activation treatment) prior to the FT reaction. By the reduction treatment, the catalyst is activated so as to exhibit a desired catalytic activity in the FT reaction. In the case that the reduction treatment is not conducted, the ruthenium compound supported on the support is not sufficiently reduced and does not exhibit a desired catalytic activity in the FT reaction.

The reduction treatment can be preferably conducted by either a method of bringing the catalyst into contact with a reductive gas in a slurry state dispersed in a liquid hydrocarbon or a method of bringing the catalyst into contact with a reductive gas by merely passing the gas through the catalyst without using the hydrocarbon.

As the liquid hydrocarbon which disperses the catalyst in the former method, use can be made of various hydrocarbons including olefins, alkanes, alicyclic hydrocarbons, and aromatic hydrocarbons as far as they are liquid under treating conditions. Moreover, they may be hydrocarbons containing heteroatom(s), such as oxygen-containing and nitrogen-containing ones. The number of carbon atoms of these hydrocarbons is not particularly limited as far as they are liquid under treating conditions but, in general, those having $C_6$ to $C_{40}$ are preferable, those having $C_9$ to $C_{40}$ are more preferable, and those having $C_9$ to $C_{35}$ are most preferable. When the number of the carbon atoms is within the above range, a sufficient reduction treatment is possible because of an appropriate vapor pressure, a wide range of the treating conditions, and a high solubility of the reductive gas.

Moreover, the amount of the catalyst to be dispersed in the hydrocarbon is appropriately from 1 to 50% by weight, preferably from 2 to 40% by weight, more preferably from 3 to 30% by weight in concentration.

When the amount of the catalyst is within the above range, reduction efficiency of the catalyst is high, viscosity of the slurry wherein the catalyst is dispersed in the hydrocarbon is appropriate, and dispersion of bubbles is satisfactory, so that a sufficient reduction of the catalyst is achieved. In this connection, as a method for preventing decrease of reduction efficiency of the catalyst, there exists a method of decreasing a passing amount of the reductive gas but the decrease of the passing amount of the reductive gas impairs dispersion of gas (reductive gas)-liquid (solvent)-solid (catalyst), so that the method is not preferable.

A temperature for the reduction treatment is preferably from 140 to 310° C., more preferably from 150 to 250° C., most preferably from 160 to 220° C. When the reduction treatment is conducted within the above range of temperature, ruthenium is sufficiently reduced and a sufficient reaction activity is obtained. Moreover, decrease of the activity is not observed, the decrease being invited by sintering of the catalyst caused by forming a complex with ruthenium owing to progress of phase transition, change in the oxidation state, and the like of the manganese oxide in the support.

For the reduction treatment, a reductive gas containing hydrogen as a main component can be preferably used.

The reductive gas to be used may contain other components other than hydrogen, such as steam, nitrogen, and rare gas, in a certain amount of a range not inhibiting the reduction.

The reduction treatment is influenced by the above temperature for the treatment and also hydrogen partial pressure and time for the treatment, but the hydrogen partial pressure is preferably from 0.1 to 10 MPa, more preferably from 0.5 to 6 MPa, most preferably from 1 to 5 MPa.

The time for the reduction treatment depends on the amount of the catalyst, the passing amount of hydrogen, and the like but, in general, is preferably from 0.1 to 72 hours, more preferably from 1 to 48 hours, most preferably from 0.1 to 72 hours in order to activate the catalyst sufficiently. In this connection, a long-term treatment exceeding 72 hours does not impart adverse effect on the catalyst but there arises an undesired problem that a cost for the treatment becomes high without any enhancement of performance of the catalyst.

In the process for producing hydrocarbons according to the invention, the catalyst subjected to the reduction treatment as mentioned above is provided to the FT reaction, i.e., a synthetic reaction of hydrocarbons. In the FT reaction in the invention, the catalyst is made a dispersed state dispersed in a liquid hydrocarbon and a syngas comprising hydrogen and carbon monoxide is brought into contact with the catalyst in the dispersed state. At that time, as the liquid hydrocarbon which disperses the catalyst, the same hydrocarbon to be used in the above reduction treatment which is conducted beforehand can be used. Namely, use can be made of various hydrocarbons including olefins, alkanes, alicyclic hydrocarbons, and aromatic hydrocarbons and hydrocarbons containing heteroatom(s), such as oxygen-containing and nitrogen-containing ones, as far as they are liquid under treating conditions. The number of carbon atoms of these hydrocarbons is not particularly limited but, in general, those having $C_6$ to $C_{40}$ are preferable, those having $C_9$ to $C_{40}$ are more preferable, and those having $C_9$ to $C_{35}$ are most preferable. When the hydrocarbon is one having number of the carbon atoms of the above range, a sufficient reaction activity is obtained because of an appropriate vapor pressure, a wide range of the treating conditions, and a high solubility of the reductive gas.

In the case that the method of dispersing the catalyst in a liquid hydrocarbon is adopted in the above reduction treatment which is conducted beforehand, the liquid hydrocarbon used in the reduction treatment can be used in the present FT reaction as it is. The amount of the catalyst to be dispersed in the hydrocarbon is from 1 to 50% by weight, preferably from 2 to 40% by weight, more preferably from 3 to 30% by weight in concentration.

When the amount of the catalyst is within the above range, activity of the catalyst is high, viscosity of the slurry wherein the catalyst is dispersed in the hydrocarbon is appropriate, and dispersion of bubbles is satisfactory, so that reaction activity of the catalyst is sufficiently obtained. In this connection, as a method for preventing decrease of reduction efficiency of the catalyst, there exists a method of decreasing a passing amount of the reductive gas but the decrease of the passing amount of the reductive gas impairs dispersion of gas (reductive gas)-liquid (solvent)-solid (catalyst), so that the method is not preferable.

The syngas for use in the FT reaction may be a gas containing hydrogen and carbon monoxide as main components and may be contaminated with other components which do not inhibit the FT reaction. The rate (k) of the FT reaction depends on the hydrogen partial pressure almost linearly and hence it is desirable that a partial pressure ratio of hydrogen to carbon monoxide (molar ratio of $H_2/CO$) is 0.6 or more. Since the reaction is a reaction in which decrease of volume is involved, higher total value of the partial pressures of hydrogen and carbon monoxide is more preferable. The upper limit of the partial pressure ratio of hydrogen to carbon monoxide is not particularly limited from the viewpoint of increase of yields of hydrocarbons formed and suppression of a ratio of light components contained in the hydrocarbons formed, but a practical range of the partial pressure ratio is appropriately from 0.6 to 2.7, preferably from 0.8 to 2.5, more preferably from 1 to 2.3.

Furthermore, in the process for producing hydrocarbons according to the invention, co-presence of carbon dioxide in the syngas is not problematic. As the carbon dioxide to be co-existed, one obtained by a reforming reaction of petroleum products or from natural gas can be used without any problem. The carbon dioxide may be contaminated with other components which do not inhibit the FT reaction and may be one containing steam or partially oxidized nitrogen, or the like as one discharged from a steam reforming reaction of petroleum products.

Moreover, carbon dioxide can be intentionally added to a syngas containing no carbon dioxide, or carbon dioxide in a syngas containing carbon dioxide obtained by reforming natural gas using a self thermal reforming process or a steam reforming process can be also utilized, that is, a syngas containing carbon dioxide can be directly provided to the FT reaction without conducting decarboxylation treatment.

When the syngas containing carbon dioxide is directly provided to the FT reaction, it is possible to reduce a facility-construction cost and a running cost required for the decarboxylation treatment, so that a production cost of hydrocarbons obtainable in the FT reaction can be reduced.

Total pressure (total value of the partial pressures of all components) of the syngas (mixed gas) to be provided to the FT reaction is preferably from 1 to 10 MPa, more preferably from 1.5 to 6 MPa, further preferably from 1.8 to 5 MPa. When the total pressure of the syngas (mixed gas) is 1 MPa or more, chain propagation becomes sufficiently large and a tendency for yields of gasoline content, kerosene and light oil content, and wax content to increase is observed, so that the case is preferable. In view of equilibrium, the higher partial pressures of hydrogen and carbon monoxide are advantageous but, from industrial viewpoints that the higher partial pressures may increase a plant-construction cost and the like and elevate a running cost owing to a large-sized compressor necessary for compression, the upper limits of the partial pressures are limited.

In the FT reaction, in general, when the ratio of $H_2/Co$ of the syngas is the same, the lower the reaction temperature is, the higher the chain growth probability and $C_5+$ selectivity are, but a CO conversion decreases.

Contrarily, when the reaction temperature is elevated, the chain growth probability and $C_5+$ selectivity decrease but the CO conversion increases. Moreover, when the ratio of $H_2/CO$ increases, the CO conversion increases and the chain growth probability and $C_5+$ selectivity decrease. When the ratio of $H_2/CO$ decreases, the results are reversed. Degrees of the effects of these factors on the reaction depend on the kind of the catalyst used or the like but, in the invention, the reaction temperature to be adopted is preferably from 200 to 350° C., more preferably from 210 to 310° C., further preferably from 220 to 290° C.

In this connection, the CO conversion, the chain growth probability (a), and the $C_5$+ productivity are values defined by the following expressions and obtained by measurements.

[CO Conversion]

CO conversion=[(CO mol number in starting gas per unit time)−(CO mol number in outlet gas per unit time)]/CO mol number in starting gas per unit time×100 (%)

[Chain Growth Probability ($\alpha$)]

When a mass fraction of a hydrocarbon having n carbon atoms in a product is referred to as Mn and a chain growth probability is referred to as $\alpha$, the relationship as shown in the following expression is established following the Schultz-Flory's distribution. Therefore, the $\alpha$ value is calculated from a slop, log $\alpha$, when log(Mn/n) and n are plotted.

log(Mn/n)=log((1−$\alpha$)$^2$/$\alpha$)+n·log $\alpha$

[Productivity of $C_5$+]

The Productivity of $C_5$+ means a produced amount of $C_5$+ for a unit time per catalyst weight and is defined by the following expression.

Productivity of $C_5$+=Produced amount of $C_5$+ [g]/ Catalyst weight [kg]/[hr]

EXAMPLES

The following will describe the invention more specifically with reference to Examples and Comparative Examples but the invention is not limited to these Examples.

Examples 1-6 and Comparative Examples 1-3 further explain Embodiment 1 in more detail. Examples 2-1 to 2-4 and Comparative Example 2-1 and 2-2 further explain Embodiment 2 in more detail.

In the following Examples, analyses of CO and $CH_4$ were conducted on a thermal conductivity gas chromatograph (TCD-GC) using active carbon (60/80 mesh) as a separation column. As a starting gas, a syngas (mixed gas of $H_2$ and CO) to which Ar was added in an amount of 10 vol. % as an internal standard was used. Qualitative and quantitative analyses were conducted by comparing peak positions and peak areas of CO and $CH_4$ with those of Ar.

For analysis of $C_1$ to $C_6$ hydrocarbons, using a flame ionization detection gas chromatography (FID-GC) wherein a capillary column ($Al_2O_3$/KCl PLOT) was used as a separation column, qualitative and quantitative analyses of the hydrocarbons were conducted by comparison with $CH_4$ which was capable of being analyzed commonly to the TCD-GC.

Furthermore, for analysis of $C_5$ to $C_{40}$+hydrocarbons, using a flame ionization detection gas chromatography (FID-GC) wherein a capillary column (TC-1) is used as a separation column, qualitative and quantitative analyses of the hydrocarbons were conducted by comparison with $C_5$ and $C_6$ which were capable of being analyzed commonly to the light hydrocarbons ($C_1$ to $C_6$).

Identification of the chemical components of catalysts was conducted by ICP (CQM-10000P, manufactured by Shimadzu Corporation).

Example 1

Pure water (hereinafter abbreviated as water) was added dropwise to an aluminum oxide powder (Pural SB, manufactured by Condea) thoroughly dried beforehand and thereby a saturated water absorption amount was determined. The saturated water absorption amount at this time was 0.9 g/g-aluminum oxide. Aluminum oxide (3.77 g) was impregnated with an aqueous solution obtained by dissolving 21.8 g of manganese nitrate hexahydrate in 3.48 g of water and, after allowed to stand for about 3 hours, the impregnate was dried in the air at 110° C. and baked in the air at 600° C. for 3 hours in a muffle furnace. The resulting support composed of the aluminum oxide and the manganese oxide was impregnated with an aqueous solution obtained by dissolving 0.05 g of sodium carbonate in 3.48 g of water. The impregnate was dried in the air at 110° C. and baked in the air at 600° C. for 3 hours in a muffle furnace. Thereafter, the support wherein the support composed of the aluminum oxide and the manganese oxide had been impregnated with sodium was impregnated with an aqueous solution obtained by dissolving 0.24 g of ruthenium chloride (Ru assay: 41.5% by weight) in 3.48 g of water and, after allowed to stand for 1 hour, the impregnate was dried in the air at 110° C. The product was transferred into an agate mortar and pulverized to obtain Catalyst A. As a result of structural analysis on X-ray diffraction, the manganese oxide was found to be $Mn_2O_3$. Moreover, as a result of chemical composition analysis of Catalyst A on ICP, the composition was 1.0% by weight in terms of Ru metal and 0.29% by weight in terms of $Na_2O$, and $Mn_2O_3$ was 60.0% by weight.

To the Catalyst A was added 100 ml of 0.05 mol/l of ammonia water, and treatment with the aqueous alkali solution was conducted with a magnetic stirrer for about 1 hour, followed by filtration and further washing and filtration with 300 ml of water. The product was dried in the air at 110° C. and then baked at 200° C. for 5 hours in a muffle furnace to obtain Active Catalyst A. As a result of structural analysis on X-ray diffraction, the manganese oxide was found to be $Mn_2O_3$. Moreover, as a result of chemical composition analysis of Active Catalyst A on ICP, the composition was 1.0% by weight in terms of Ru metal and 0.10% by weight in terms of $Na_2O$, and $Mn_2O_3$ was 60.3% by weight on the basis of the catalyst.

Active Catalyst A (2.0 g) was charged into a reactor having an inner volume of 100 ml together with 40 ml of n-hexadecane (n-$Cl_6H_{34}$, hereinafter abbreviated as solvent) as a dispersing medium (slurry concentration: 6% by weight), and reduction was conducted for 3 hours by bringing hydrogen into contact with Active Catalyst A at a hydrogen partial pressure of 2 MPa·G at a temperature of 170° C. at a flow rate of 100 (STP) ml/min (STP: standard temperature and pressure). After reduction, hydrogen was switched to a syngas having a $H_2$/CO ratio of about 2 (containing about 10 vol. % of Ar) and the FT reaction was conducted at a temperature of 260° C. at an $H_2$+CO pressure of 2.4 MPa·G. W/F (weight/ flow [g·hr/mol] was about 4.7 g·hr/mol. After 50 hours from the start of the FT reaction, CO conversion was about 62%, $CH_4$ selectivity was about 4%, $C_5$+ selectivity was about 92%, chain growth probability was 0.91, and $C_5$+ productivity was 568 g/kg/hr.

Example 2

Catalyst B was obtained in the same preparation manner as in Example 1 by impregnating 4.54 g of aluminum oxide with 18.16 g of manganese nitrate, then 0.1 g of sodium carbonate, and finally 0.48 g of ruthenium chloride. As a result of structural analysis on X-ray diffraction, the manganese oxide was found to be $Mn_2O_3$. Moreover, as a result of chemical composition analysis of Catalyst B on ICP, the composition was 2.0% by weight in terms of metal and 0.58% by weight in terms of $Na_2O$, and $Mn_2O_3$ was 50.0% by weight. To the Catalyst B was added 100 ml of 0.08 mol/l of ammonia water, and treatment with the aqueous alkali solution was conducted with a magnetic stirrer for about 1 hour, followed by filtration and further washing and filtration with 300 ml of water. The product was dried in the air at 110° C. and then baked at 250° C. for 5 hours in a muffle furnace to obtain Active Catalyst B. As a result of structural analysis on X-ray diffraction, the manganese oxide was found to be $Mn_2O_3$. Moreover, as a result of chemical composition analysis of Active Catalyst B on ICP, the composition was 2.0% by weight in terms of Ru metal and 0.30% by weight in terms of $Na_2O$, and $Mn_2O_3$ was 50.5% by weight, on the basis of the catalyst.

The Active Catalyst B was provided to the FT reaction in the same manner as in Example 1. After 50 hours from the start of the FT reaction, CO conversion was about 70%, $CH_4$ selectivity was about 3%, $C_5+$ selectivity was about 93%, chain growth probability was 0.91, and $C_5+$ productivity was 648 g/kg/hr.

Example 3

Catalyst C was obtained in the same preparation manner as in Example 1 by impregnating 6.31 g of aluminum oxide with 10.9 g of manganese nitrate, then 0.15 g of sodium carbonate, and finally 0.72 g of ruthenium chloride. As a result of structural analysis on X-ray diffraction, the manganese oxide was found to be $Mn_2O_3$. Moreover, as a result of chemical composition analysis of Catalyst C on ICP, the composition was 3.0% by weight in terms of metal and 0.88% by weight in terms of $Na_2O$, and $Mn_2O_3$ was 30.0% by weight. To the Catalyst C was added 100 ml of 0.1 mol/l of ammonia water, and treatment with the aqueous alkali solution was conducted with a magnetic stirrer for about 1 hour, followed by filtration, and washing and filtration with 300 ml of water. Thereto was added 100 ml of 0.1 mol/l of ammonia water, and treatment with the aqueous alkali solution was conducted with a magnetic stirrer for about 1 hour, followed by filtration, and washing and filtration with 300 ml of water. The product was dried in the air at 110° C. and then baked at 300° C. for 5 hours in a muffle furnace to obtain Active Catalyst C. As a result of structural analysis on X-ray diffraction, the manganese oxide was found to be $Mn_2O_3$. Moreover, as a result of chemical composition analysis of Active Catalyst C on ICP, the composition was 3.0% by weight in terms of Ru metal and 0.03% by weight in terms of $Na_2O$, and $Mn_2O_3$ was 30.7% by weight, on the basis of the catalyst.

The Active Catalyst C was provided to the FT reaction in the same manner as in Example 1. After 50 hours from the start of the FT reaction, CO conversion was about 81%, $CH_4$ selectivity was about 3%, $C_5+$ selectivity was about 93%, chain growth probability was 0.90, and $C_5+$ productivity was 750 g/kg/hr.

Example 4

Catalyst D was obtained in the same preparation manner as in Example 1 by impregnating 7.08 g of aluminum oxide with 7.27 g of manganese nitrate, then 0.21 g of sodium carbonate, and finally 0.96 g of ruthenium chloride. As a result of structural analysis on X-ray diffraction, the manganese oxide was found to be $Mn_2O_3$. Moreover, as a result of chemical composition analysis of Catalyst D on ICP, the composition was 4.0% by weight in terms of metal and 1.19% by weight in terms of $Na_2O$, and $Mn_2O_3$ was 20.0% by weight. To the Catalyst D was added 100 ml of 0.15 mol/l of ammonia water, and treatment with the aqueous alkali solution was conducted with a magnetic stirrer for about 1 hour, followed by filtration, and washing and filtration with 300 ml of water. The product was dried in the air at 110° C. and then baked at 450° C. for 3 hours in a muffle furnace to obtain Active Catalyst D. As a result of structural analysis on X-ray diffraction, the manganese oxide was found to be $Mn_2O_3$. Moreover, as a result of chemical composition analysis of Active Catalyst D on ICP, the composition was 4.0% by weight in terms of Ru metal and 0.50% by weight in terms of $Na_2O$, and $Mn_2O_3$ was 20.3% by weight, on the basis of the catalyst.

The Active Catalyst D was provided to the FT reaction in the same manner as in Example 1. After 50 hours from the start of the FT reaction, CO conversion was about 88%, $CH_4$ selectivity was about 4%, $C_5+$ selectivity was about 90%, chain growth probability was 0.90, and $C_5+$ productivity was 788 g/kg/hr.

Example 5

Catalyst E was obtained in the same preparation manner as in Example 1 by impregnating 6.28 g of aluminum oxide with 10.9 g of manganese nitrate, then 0.76 g of magnesium nitrate hexahydrate, finally 0.72 g of ruthenium chloride. As a result of structural analysis on X-ray diffraction, the manganese oxide was found to be $Mn_2O_3$. Moreover, as a result of chemical composition analysis of Catalyst E on ICP, the composition was 3.0% by weight in terms of metal and 1.20% by weight in terms of MgO, and $Mn_2O_3$ was 30.0% by weight. To the Catalyst E was added 100 ml of 0.10 mol/l of ammonia water, and treatment with the aqueous alkali solution was conducted with a magnetic stirrer for about 1 hour, followed by filtration, and washing and filtration with 300 ml of water. The product was dried in the air at 110° C. and then baked at 400° C. for 5 hours in a muffle furnace to obtain Active Catalyst E. As a result of structural analysis on X-ray diffraction, the manganese oxide was found to be $Mn_2O_3$. Moreover, as a result of chemical composition analysis of Catalyst E on ICP, the composition was 3.0% by weight in terms of Ru metal and 0.40% by weight in terms of MgO, and $Mn_2O_3$ was 30.3% by weight, on the basis of the catalyst.

The Active Catalyst E was provided to the FT reaction in the same manner as in Example 1. After 50 hours from the start of the FT reaction, CO conversion was about 85%, $CH_4$ selectivity was about 4%, $C_5+$ selectivity was about 90%, chain growth probability was 0.90, and $C_5+$ productivity was 761 g/kg/hr.

Example 6

Catalyst F was obtained in the same preparation manner as in Example 1 by impregnating 6.25 g of aluminum oxide with 10.9 g of manganese nitrate, then 0.4 g of lanthanum nitrate hexahydrate, finally 0.72 g of ruthenium chloride. As a result of structural analysis on X-ray diffraction, the manganese oxide was found to be $Mn_2O_3$. Moreover, as a result of chemical composition analysis of Catalyst F on ICP, the composition was 3.0% by weight in terms of metal and 1.50% by weight in terms of $La_2O_3$, and $Mn_2O_3$ was 30.0% by weight. To the Catalyst F was added 100 ml of 0.10 mol/l of ammonia water, and treatment with the aqueous alkali solution was conducted with a magnetic stirrer for about 1 hour, followed by filtration, and washing and filtration with 300 ml of water.

The product was dried in the air at 110° C. and then baked at 400° C. for 5 hours in a muffle furnace to obtain Active Catalyst F. As a result of structural analysis on X-ray diffraction, the manganese oxide was found to be $Mn_2O_3$. Moreover, as a result of chemical composition analysis of Active Catalyst F on ICP, the composition was 3.0% by weight in terms of Ru metal and 1.41% by weight in terms of $La_2O_3$, and $Mn_2O_3$ was 30.1% by weight, on the basis of the catalyst.

The Active Catalyst F was provided to the FT reaction in the same manner as in Example 1. After 50 hours from the start of the FT reaction, CO conversion was about 82%, $CH_4$ selectivity was about 5%, $C_5+$ selectivity was about 90%, chain growth probability was 0.90, and $C_5+$ productivity was 734 g/kg/hr.

Comparative Example 1

Catalyst G and Active Catalyst G were obtained in the same manner as in Example 3 except that the calcination treatment at 300° C. was not conducted. As a result of structural analysis on X-ray diffraction, the manganese oxide was found to be $Mn_2O_3$. Moreover, as a result of chemical composition analysis of Catalyst G on ICP, the composition was 3.0% by weight in terms of metal and 0.88% by weight in terms of $Na_2O$, and $Mn_2O_3$ was 30.0% by weight. Furthermore, as a result of chemical composition analysis of Active Catalyst G on ICP, the composition was 3.0% by weight in terms of Ru metal and 0.03% by weight in terms of $Na_2O$, and $Mn_2O_3$ was 31.0% by weight, on the basis of the catalyst.

The Active Catalyst G was provided to the FT reaction in the same manner as in Example 1. After 50 hours from the start of the FT reaction, CO conversion was about 50%, $CH_4$ selectivity was about 7%, $C_5+$ selectivity was about 85%, chain growth probability was 0.90, and $C_5+$ productivity was 423 g/kg/hr.

Comparative Example 2

Catalyst H and Active Catalyst H were obtained in the same manner as in Example 3 except that the treatment of the aqueous alkali solution was not conducted. As a result of structural analysis on X-ray diffraction, the manganese oxide was found to be $Mn_2O_3$. Moreover, as a result of chemical composition analysis of Catalyst H on ICP, the composition was 3.0% by weight in terms of metal and 0.89% by weight in terms of $Na_2O$, and $Mn_2O_3$ was 30.0% by weight. Furthermore, as a result of chemical composition analysis of Active Catalyst H on ICP, the composition was 3.0% by weight in terms of Ru metal and 0.90% by weight in terms of $Na_2O$, and $Mn_2O_3$ was 30.0% by weight, on the basis of the catalyst.

The Active Catalyst H was provided to the FT reaction in the same manner as in Example 1. After 50 hours from the start of the FT reaction, CO conversion was about 31%, $CH_4$ selectivity was about 25%, $C_5+$ selectivity was about 57%, chain growth probability was 0.72, and $C_5+$ productivity was 176 g/kg/hr.

Comparative Example 3

Catalyst I and Active Catalyst I were obtained in the same manner as in Example 3 except that the calcination treatment was conducted in a helium stream. As a result of structural analysis on X-ray diffraction, the manganese oxide was found to be $Mn_2O_3$. Moreover, as a result of chemical composition analysis of Catalyst I on ICP, the composition was 3.0% by weight in terms of metal and 0.88% by weight in terms of $Na_2O$, and $Mn_2O_3$ was 30.0% by weight. Furthermore, as a result of chemical composition analysis of Active Catalyst I on ICP, the composition was 3.0% by weight in terms of Ru metal and 0.03% by weight in terms of $Na_2O$, and $Mn_2O_3$ was 30.5% by weight, on the basis of the catalyst.

The Active Catalyst I was provided to the FT reaction in the same manner as in Example 1. After 50 hours from the start of the FT reaction, CO conversion was about 52%, $CH_4$ selectivity was about 6%, $C_5+$ selectivity was about 86%, chain growth probability was 0.90, and $C_5+$ productivity was 445 g/kg/hr.

The experimental results of the above Examples 1 to 4 and Comparative Examples 1 to 3 are shown in Table 1 and Table 2.

TABLE 1

|  | Example 1 | Example 2 | Example 3 | Example 4 | Example 5 | Example 6 |
| --- | --- | --- | --- | --- | --- | --- |
| Catalyst | A | B | C | D | E | F |
| Ru weight % | 1.0 | 2.0 | 3.0 | 4.0 | 3.0 | 3.0 |
| $Mn_2O_3$ weight % | 60.0 | 50.0 | 30.0 | 20.0 | 30.0 | 30.0 |
| $Na_2O$ weight % | 0.29 | 0.58 | 0.88 | 1.19 | — | — |
| MgO weight % | — | — | — | — | 1.20 | — |
| $La_2O_3$ weight % | — | — | — | — | — | 1.50 |
| Concentration of ammonia water (mol/l) | 0.05 | 0.08 | 0.10 | 0.15 | 0.10 | 0.10 |
| Temperature of calcination treatment (° C.) | 200 | 250 | 300 | 450 | 400 | 400 |
| Active Catalyst | A | B | C | D | E | F |
| Ru weight % | 1.0 | 2.0 | 3.0 | 4.0 | 3.0 | 3.0 |
| $Mn_2O_3$ weight % | 60.3 | 50.5 | 30.7 | 20.3 | 30.3 | 30.1 |
| $Na_2O$ weight % | 0.10 | 0.30 | 0.03 | 0.50 | — | — |
| MgO weight % | — | — | — | — | 0.40 | — |
| $La_2O_3$ weight % | — | — | — | — | — | 1.41 |
| CO conversion (%) | 62 | 70 | 81 | 88 | 85 | 82 |
| $CH_4$ selectivity (%) | 4 | 3 | 3 | 4 | 4 | 5 |
| $C_5+$ selectivity (%) | 92 | 93 | 93 | 90 | 90 | 90 |

TABLE 1-continued

|  | Example 1 | Example 2 | Example 3 | Example 4 | Example 5 | Example 6 |
|---|---|---|---|---|---|---|
| Chain growth probability | 0.91 | 0.91 | 0.90 | 0.90 | 0.90 | 0.90 |
| $C_5$+ productivity | 568 | 648 | 750 | 788 | 761 | 734 |

TABLE 2

|  | Comparative Example 1 | Comparative Example 2 | Comparative Example 3 |
|---|---|---|---|
| Catalyst | G | H | I |
| Ru weight % | 3.0 | 3.0 | 3.0 |
| $Mn_2O_3$ weight % | 30.0 | 30.0 | 30.0 |
| $Na_2O$ weight % | 0.88 | 0.89 | 0.88 |
| Concentration of ammonia water (mol/l) | 0.10 | — | 0.10 |
| Temperature of calcination treatment (° C.) | — | 300 | 300 (in He stream) |
| Active Catalyst | G | H | I |
| Ru weight % | 3.0 | 3.0 | 3.0 |
| $Mn_2O_3$ weight % | 31.0 | 30.0 | 30.5 |
| $Na_2O$ weight % | 0.03 | 0.90 | 0.03 |
| CO conversion (%) | 50 | 31 | 52 |
| $CH_4$ selectivity (%) | 7 | 25 | 6 |
| $C_5$+ selectivity (%) | 85 | 57 | 86 |
| Chain growth probability | 0.90 | 0.72 | 0.90 |
| $C_5$+ productivity | 423 | 176 | 445 |

As apparent from Table 1 and Table 2, the catalysts subjected to the calcination treatment in the air after the treatment with the aqueous alkali solution is low in a gas content ($CH_4$ selectivity), exhibits high CO conversion and $C_5$+ selectivity, and thus exhibit an excellent performance of a high $C_5$+ productivity, i.e., a high yield of a liquid hydrocarbon fraction.

Example 2-1

As an aluminum oxide, HCK-841 manufactured by Nippon Ketjen Co., Ltd. was used. As a result of measurement of pore distribution of the aluminum oxide, total pore volume was 0.561 cm³/g, pore volume formed by pores having a pore diameter of 8 nm or more was 0.53 cm³/g, and its ratio to the total pore volume was about 94%. After it was thoroughly dried beforehand, pure water (hereinafter abbreviated as water) was added dropwise to a pulverized powder of the aluminum oxide and thereby a saturated water absorption amount was determined. The saturated water absorption amount at this time was 1.2 g/g-catalyst. Aluminum oxide (6.61 g) was impregnated with an aqueous solution obtained by dissolving 10.9 g of manganese nitrate hexahydrate in 7.93 g of water and, after allowed to stand for about 3 hours, the impregnate was dried in the air at 110° C. and baked in the air at 600° C. for 3 hours in a muffle furnace. The resulting support composed of the aluminum oxide and the manganese oxide was impregnated with an aqueous solution obtained by dissolving 0.15 g of sodium carbonate in 7.93 g of water. The impregnate was dried in the air at 110° C. and baked in the air at 600° C. for 3 hours in a muffle furnace. Thereafter, the support wherein the support composed of the aluminum oxide and the manganese oxide had been impregnated with sodium was impregnated with an aqueous solution obtained by dissolving 0.72 g of ruthenium chloride (Ru assay: 41.5% by weight) in 7.93 g of water and, after allowed to stand for 1 hour, the impregnate was dried in the air at 110° C. The product was transferred into an agate mortar and pulverized to obtain Catalyst Al. As a result of structural analysis on X-ray diffraction, the manganese oxide was found to be $Mn_2O_3$. Moreover, as a result of chemical composition analysis of Catalyst Al on ICP, the composition was 3.0% by weight in terms of metal and 0.88% by weight in terms of $Na_2O$, and $Mn_2O_3$ was 30.0% by weight.

Physical properties of Catalyst Al determined by BET method with nitrogen adsorption and from isothermal curve of adsorption and desorption are shown in Table 3.

TABLE 3

|  | Catalyst A1 |
|---|---|
| Specific surface area cm²/g | 75.7 |
| Pore volume cm³/g | 0.41 |
| Mean pore diameter nm | 21.5 |

Active Catalyst Al (2.0 g) was charged into a reactor having an inner volume of 100 ml together with 40 ml of n-hexadecane (n-$C_{16}H_{34}$, hereinafter abbreviated as solvent) as a dispersing medium (slurry concentration: 6% by weight) and reduction was conducted for 3 hours by bringing hydrogen into contact with Active Catalyst Al at a hydrogen partial pressure of 2 MPa·G at a temperature of 170° C. at a flow rate of 100 (STP) ml/min (STP: standard temperature and pressure). After reduction, hydrogen was switched to a syngas having a $H_2$/CO ratio of about 2 (containing about 10 vol. % of Ar) and an FT reaction was conducted at a temperature of 270° C. at an $H_2$+CO pressure of 2.0 MPa·G. W/F (weight/flow [g-hr/mol] was about 4.7 g·hr/mol. After 50 hours from the start of the FT reaction, CO conversion was about 80%, $CH_4$ selectivity was about 9%, $C_5$+ selectivity was about 88, chain growth probability was about 0.90, and $C_5$+ productivity was about 701 g/kg/hr.

Comparative Example 2-1

As an aluminum oxide, Pural SB manufactured by Condea was used. As a result of measurement of pore distribution of the aluminum oxide, total pore volume was 0.411 cm³/g, pore volume formed by pores having a pore diameter of 8 nm or more was 0.115 cm³/g, and its ratio to the total pore volume was about 28%. As a result of measurement of a saturated water absorption amount in the same manner as in Example 2-1, it was 0.9 g/g-catalyst. Catalyst B1 was obtained in the same preparation manner as in Example 2-1 by impregnating 6.61 g of aluminum oxide with 10.9 g of manganese nitrate, then 0.15 g of sodium carbonate, and finally 0.72 g of ruthenium chloride. As a result of structural analysis on X-ray diffraction, the manganese oxide was found to be $Mn_2O_3$. Moreover, as a result of chemical composition analysis of Catalyst B1 on ICP, the composition was 3.0% by weight in terms of metal and 0.89% by weight in terms of $Na_2O$, and $Mn_2O_3$ was 30.0% by weight.

The Active Catalyst B1 was provided to the FT reaction in the same manner as in Example 2-1. After 50 hours from the start of the FT reaction, CO conversion was about 60%, $CH_4$ selectivity was about 10%, $C_5$+ selectivity was about 85%, chain growth probability was about 0.90, and $C_5$+ productivity was about 507 g/kg/hr.

Example 2-2

As an aluminum oxide, NK607 manufactured by Nippon Ketjen Co., Ltd. was used. As a result of measurement of pore distribution of the aluminum oxide, total pore volume was 0.622 $cm^3/g$, pore volume formed by pores having a pore diameter of 8 nm or more was 0.560 $cm^3/g$, and its ratio to the total pore volume was about 90%. As a result of measurement of a saturated water absorption amount in the same manner as in Example 2-1, it was 1.3 g/g-catalyst. Catalyst C1 was obtained in the same preparation manner as in Example 2-1 by impregnating 4.87 g of aluminum oxide with 18.16 g of manganese nitrate, then 0.05 g of sodium carbonate, and finally 0.24 g of ruthenium chloride. As a result of structural analysis on X-ray diffraction, the manganese oxide was found to be $Mn_2O_3$. Moreover, as a result of chemical composition analysis of Catalyst C1 on ICP, the composition was 1.0% by weight in terms of metal and 0.29% by weight in terms of $Na_2O$, and $Mn_2O_3$ was 50.0% by weight.

After the Catalyst C1 was reduced in the same manner as in Example 2-1, hydrogen was switched to a syngas having a $H_2$/CO ratio of about 2 (containing about 10 vol. % of Ar) and an FT reaction was conducted at a temperature of 260° C. at an $H_2$+CO pressure of 2.4 MPa·G. W/F (weight/flow [g-hr/mol] was about 9.4 g-hr/mol. After 50 hours from the start of the FT reaction, CO conversion was about 76%, $CH_4$ selectivity was about 5%, $C_5$+ selectivity was about 88%, chain growth probability was about 0.90, and $C_5$+ productivity was about 333 g/kg/hr.

Comparative Example 2-2

As an aluminum oxide, KHA-24 manufactured by Sumitomo Chemical Co., Ltd. was used. As a result of measurement of pore distribution of the aluminum oxide, total pore volume was 0.418 $cm^3/g$, pore volume formed by pores having a pore diameter of 8 nm or more was 0.200 $cm^3/g$, and its ratio to the total pore volume was about 48%. As a result of measurement of a saturated water absorption amount in the same manner as in Example 2-1, it was 0.9 g/g-catalyst. Catalyst D1 was obtained in the same preparation manner as in Example 2-1 by impregnating 4.87 g of aluminum oxide with 18.16 g of manganese nitrate, then 0.05 g of sodium carbonate, and finally 0.24 g of ruthenium chloride. As a result of structural analysis on X-ray diffraction, the manganese oxide was found to be $Mn_2O_3$. Moreover, as a result of chemical composition analysis of Catalyst D1 on ICP, the composition was 1.0% by weight in terms of metal and 0.29% by weight in terms of $Na_2O$, and $Mn_2O_3$ was 50.0% by weight. The Active Catalyst D1 was provided to the FT reaction in the same manner as in Example 2-2. After 50 hours from the start of the FT reaction, CO conversion was about 61%, $CH_4$ selectivity was about 7%, $C_5$+ selectivity was about 85%, chain growth probability was about 0.90, and $C_5$+ productivity was about 258 g/kg/hr.

Example 2-3

As an aluminum oxide, KHS-46 manufactured by Sumitomo Chemical Co., Ltd. was used. As a result of measurement of pore distribution of the aluminum oxide, total pore volume was 0.483 $cm^3/g$, pore volume formed by pores having a pore diameter of 8 nm or more was 0.340 $cm^3/g$, and its ratio to the total pore volume was about 70%. As a result of measurement of a saturated water absorption amount in the same manner as in Example 2-1, it was 1.0 g/g-catalyst. Catalyst E1 was obtained in the same preparation manner as in Example 2-1 by impregnating 6.61 g of aluminum oxide with 10.9 g of manganese nitrate, then 0.76 g of magnesium nitrate hexahydrate, and finally 0.72 g of ruthenium chloride. As a result of structural analysis on X-ray diffraction, the manganese oxide was found to be $Mn_2O_3$. Moreover, as a result of chemical composition analysis of Catalyst E1 on ICP, the composition was 3.0% by weight in terms of metal and 1.20% by weight in terms of MgO, and $Mn_2O_3$ was 30.0% by weight.

The Active Catalyst E1 was provided to the FT reaction in the same manner as in Example 2-1. After 50 hours from the start of the FT reaction, CO conversion was about 72%, $CH_4$ selectivity was about 10%, $C_5$+ selectivity was about 86%, chain growth probability was about 0.89, and $C_5$+ productivity was about 616 g/kg/hr.

Example 2-4

As an aluminum oxide, NK-124 manufactured by Sumitomo Chemical Co., Ltd. was used. As a result of measurement of pore distribution of the aluminum oxide, total pore volume was 0.453 $cm^3/g$, pore volume formed by pores having a pore diameter of 8 nm or more was 0.380 $cm^3/g$, and its ratio to the total pore volume was about 84%. As a result of measurement of a saturated water absorption amount in the same manner as in Example 2-1, it was 1.0 g/g-catalyst. Catalyst F1 was obtained in the same preparation manner as in Example 2-1 by impregnating 6.61 g of aluminum oxide with 10.9 g of manganese nitrate, then 0.4 g of lanthanum nitrate hexahydrate, and finally 0.72 g of ruthenium chloride. As a result of structural analysis on X-ray diffraction, the manganese oxide was found to be $Mn_2O_3$. Moreover, as a result of chemical composition analysis of Catalyst F1 on ICP, the composition was 3.0% by weight in terms of metal and 1.50% by weight in terms of $La_2O_3$, and $Mn_2O_3$ was 30.0% by weight.

The Active Catalyst F1 was provided to the FT reaction in the same manner as in Example 2-1. After 50 hours from the start of the FT reaction, CO conversion was about 75%, $CH_4$ selectivity was about 9%, $C_5$+ selectivity was about 87%, chain growth probability was about 0.89, and $C_5$+ productivity was about 649 g/kg/hr.

Example 2-5

Change with time of the catalytic activity after 10 hours, 50 hours, 100 hours, and 200 hours of the FT reaction conducted in Example 2-1 is shown in Table 6.

The experimental results of the above Examples 2-1 to 2-4 and Comparative Examples 2-1 to 2-2 are shown in Tables 4 to 6.

TABLE 4

|  | Example 2-1 | Comparative Example 2-1 | Example 2-3 | Example 2-4 |
|---|---|---|---|---|
| Catalyst | A1 | B1 | C1 | D1 |
| $Al_2O_3$ | HCK-841 | SB | KHS-46 | NK-124 |
| Total pore volume (A) cm³/g | 0.561 | 0.411 | 0.483 | 0.453 |
| Pore volume (B) of pores having pore diameter of 8 nm or more cm³/g | 0.530 | 0.115 | 0.340 | 0.380 |
| (B)/(A) | 0.94 | 0.28 | 0.70 | 0.84 |
| Ru weight % | 3.0 | 3.0 | 3.0 | 3.0 |
| $Mn_2O_3$ weight % | 30.0 | 30.0 | 30.0 | 30.0 |
| $Na_2O$ weight % | 0.88 | 0.89 | — | — |
| MgO weight % | — | — | 1.20 | — |
| $La_2O_3$ weight % | — | — | — | 1.50 |
| CO conversion (%) | 80 | 60 | 72 | 75 |
| $CH_4$ selectivity (%) | 9 | 10 | 10 | 9 |
| $C_5+$ selectivity (%) | 88 | 85 | 86 | 87 |
| Chain growth probability | 0.90 | 0.90 | 0.89 | 0.89 |
| $C_5+$ productivity g/kg/hr | 701 | 507 | 616 | 649 |

TABLE 5

|  | Example 2-1 | Comparative Example 2-1 |
|---|---|---|
| Catalyst | E1 | F1 |
| $Al_2O_3$ | NK607 | KHA-24 |
| Total pore volume (A) cm³/g | 0.622 | 0.418 |
| Pore volume (B) of pores having pore diameter of 8 nm or more cm³/g | 0.560 | 0.200 |
| (B)/(A) | 0.90 | 0.48 |
| Ru weight % | 1.0 | 1.0 |
| $Mn_2O_3$ weight % | 50.0 | 50.0 |
| $Na_2O$ weight % | 0.29 | 0.29 |
| MgO weight % | — | — |
| $La_2O_3$ weight % | — | — |
| CO conversion (%) | 76 | 61 |
| $CH_4$ selectivity (%) | 5 | 7 |
| $C_5+$ selectivity (%) | 88 | 85 |
| Chain growth probability | 0.90 | 0.90 |
| $C_5+$ productivity g/kg/hr | 447 | 321 |

TABLE 6

|  | After 10 hours | After 50 hours | After 100 hours | After 200 hours |
|---|---|---|---|---|
| CO conversion (%) | 82 | 80 | 80 | 79 |
| $CH_4$ selectivity (%) | 9 | 9 | 10 | 10 |
| $C_5+$ selectivity (%) | 88 | 88 | 88 | 88 |
| Chain growth probability | 0.90 | 0.90 | 0.91 | 0.91 |
| $C_5+$ productivity g/kg/hr | 718 | 701 | 701 | 692 |

From the results shown in Table 4 and Table 5, the following are apparent.

The cases that the catalysts of the invention are used (Examples 2-1 to 2-4) are excellent in all of CO conversion, $CH_4$ selectivity, $C_5+$ selectivity, chain growth probability, and $C_5+$ productivity. On the other hand, the cases that the catalysts wherein the pore volume formed by pores having a pore diameter of 8 nm or more is less than 50% of the total pore volume are used (Comparative Examples 2-1 and 2-2) are poor in CO conversion and $C_5+$ productivity.

Moreover, from the results shown in Table 6, in the case that the catalysts of the invention are used, objective compounds can be stably produced with maintaining the above performance even when operations were continued for a long period of time.

While the invention has been described in detail and with reference to specific embodiments thereof, it will be apparent to one skilled in the art that various changes and modifications can be made therein without departing from the spirit and scope thereof.

The present application is based on Japanese Patent Application No. 2004-47828 filed on Feb. 24, 2004 and Japanese Patent Application No. 2004-47830 filed on Feb. 24, 2004, and the contents are incorporated herein by reference.

INDUSTRIAL APPLICABILITY

According to the invention, there is provided a catalyst which exhibits a high catalytic activity, forms a little gaseous components, and exhibits a high productivity of a $C_5+$ liquid hydrocarbon fraction, a process for producing the same, and a process for producing hydrocarbons using the catalyst.

The invention claimed is:

1. A catalyst for a Fischer-Tropsch reaction, which produces hydrocarbons from syngas and is obtained by supporting a ruthenium compound on a support composed of a manganese oxide and an aluminum oxide, and which satisfies characteristic (1) or characteristics (1) and (2):
   (1) the catalyst being treated with an aqueous alkaline solution and subsequently subjected to calcination treatment in an air at 150 to 500° C.,
   (2) the aluminum oxide being an aluminum oxide in which pore volume formed by pores having a pore diameter of 8 nm or more accounts for 50% or more of total pore volume, wherein at least one sodium compound is further supported on the support.

2. The catalyst according to claim 1, wherein a supported amount of the ruthenium compound is from 0.5 to 5% by weight in terms of ruthenium metal on a basis of the catalyst before the treatment with the aqueous alkaline solution and the calcination treatment.

3. The catalyst according to claim 1, wherein a supported amount of the sodium compound is from 0.01 to 3% by weight in terms of oxide on a basis of the catalyst before the treatment with the aqueous alkaline solution and the calcination treatment.

4. A process for producing hydrocarbons, which comprises bringing a mixed gas containing hydrogen and carbon monoxide into contact with the catalyst according to any one of claims 1, 2 or 3.

5. The catalyst according to any one of claims 1, 2 or 3, wherein a ratio of the manganese oxide is from 10 to 70% by weight on a basis of the catalyst before the treatment with the aqueous alkaline solution and the calcination treatment.

6. A process for producing a hydrocarbon-producing catalyst, which comprises treating, with an aqueous alkaline solution, a catalyst obtainable by supporting a ruthenium compound on a support composed of a manganese oxide and an aluminum oxide and subsequently subjecting the catalyst to calcination treatment in the air at 150 to 500° C.

7. The process according to claim 6, wherein the supported amount of the ruthenium compound is from 0.5 to 5% by weight in terms of metal on the basis of the catalyst before the treatment with the aqueous alkaline solution and the calcination treatment.

8. The process according to claim 6 or 7, wherein at least one compound selected from alkali metal compounds, alkaline earth metal compounds, and rare earth metal compounds is further supported on the support.

9. The process according to claim 8, wherein the supported amount of at least one compound selected from alkali metal compounds, alkaline earth metal compounds, and rare earth metal compounds is from 0.01 to 3% by weight in terms of oxide on the basis of the catalyst before the treatment with the aqueous alkaline solution and the calcination treatment.

10. The process for producing the catalyst according to claim 8, wherein said at least one compound selected from alkali metal compounds, alkaline earth metal compounds, and rare earth metal compounds is a sodium compound.

11. The process according to claim 6, wherein the ratio of the manganese oxide is from 10 to 70% by weight on the basis of the catalyst before the treatment with the aqueous alkaline solution and the calcination treatment.

12. A process for producing hydrocarbons, which comprises bringing a mixed gas containing hydrogen and carbon monoxide into contact with the catalyst obtained by the production process according to claim 6.

13. A process for producing hydrocarbons by the Fischer-Tropsch reaction, which process comprises contacting syngas under Fischer-Tropsch reaction condition with the catalyst of claim 1 for a time sufficient to produce said hydrocarbons.

14. The process of claim 13, wherein the syngas contains hydrogen and carbon monoxide as main components at a partial pressure ratio of hydrogen/carbon monoxide of 0.6 to 2.7, and the reaction is conducted at 200 to 350° C.

\* \* \* \* \*